United States Patent
Furuya et al.

(10) Patent No.: US 7,586,048 B2
(45) Date of Patent: Sep. 8, 2009

(54) ELECTRONIC COMPONENT

(75) Inventors: Akira Furuya, Tokyo (JP); Masahiro Miyazaki, Tokyo (JP); Hajime Kuwajima, Tokyo (JP); Makoto Shibata, Tokyo (JP)

(73) Assignee: TDK Corporation, Tokyo (JP)

( * ) Notice: Subject to any disclaimer, the term of this patent is extended or adjusted under 35 U.S.C. 154(b) by 211 days.

(21) Appl. No.: 11/528,331

(22) Filed: Sep. 28, 2006

(65) Prior Publication Data

US 2007/0089904 A1     Apr. 26, 2007

(30) Foreign Application Priority Data

Oct. 26, 2005   (JP)  .............. 2005-310967

(51) Int. Cl.
   *H01L 23/28*   (2006.01)
   *H05K 7/14*    (2006.01)
(52) U.S. Cl. ..................... 174/521; 174/535
(58) Field of Classification Search ........... 174/521, 174/528, 531, 536, 552, 535; 257/702, 792
   See application file for complete search history.

(56) References Cited

U.S. PATENT DOCUMENTS

2002/0020865 A1* 2/2002 Ono et al. ............ 257/296
2005/0068148 A1  3/2005 Yoshida et al.

FOREIGN PATENT DOCUMENTS

| JP | A-58-096710 | 6/1983 |
|----|----|----|
| JP | A 64-047003 | 2/1989 |
| JP | A 06-180820 | 6/1994 |
| JP | A 11-306511 | 11/1999 |
| JP | A 2001-023801 | 1/2001 |
| JP | A 2005-072065 | 3/2005 |
| JP | A 2005-079323 | 3/2005 |

* cited by examiner

*Primary Examiner*—Hung V Ngo
(74) *Attorney, Agent, or Firm*—Oliff & Berridge, PLC

(57) ABSTRACT

The invention relates to a surface mount type electronic component to be mounted on a printed circuit board or a hybrid IC (HIC) and provides a low-cost electronic component which is reliable in terms of heat resistance and pressure resistance. An inductor as the electronic component has a general outline in the form of a rectangular parallelepiped, provided by forming a lead-out electrode having a multi-layer structure on a substrate and forming a protective layer for protecting the lead-out electrode using thin film forming techniques. The lead-out electrode includes a first electrode which is electrically connected to a coil conductor and which has an exposed part exposed on an outer surface and a second electrode which has an exposed part exposed on the outer surface to extend an electrode width different from an electrode width of the first electrode and which is formed directly above the first electrode and electrically connected to the first electrode.

10 Claims, 4 Drawing Sheets

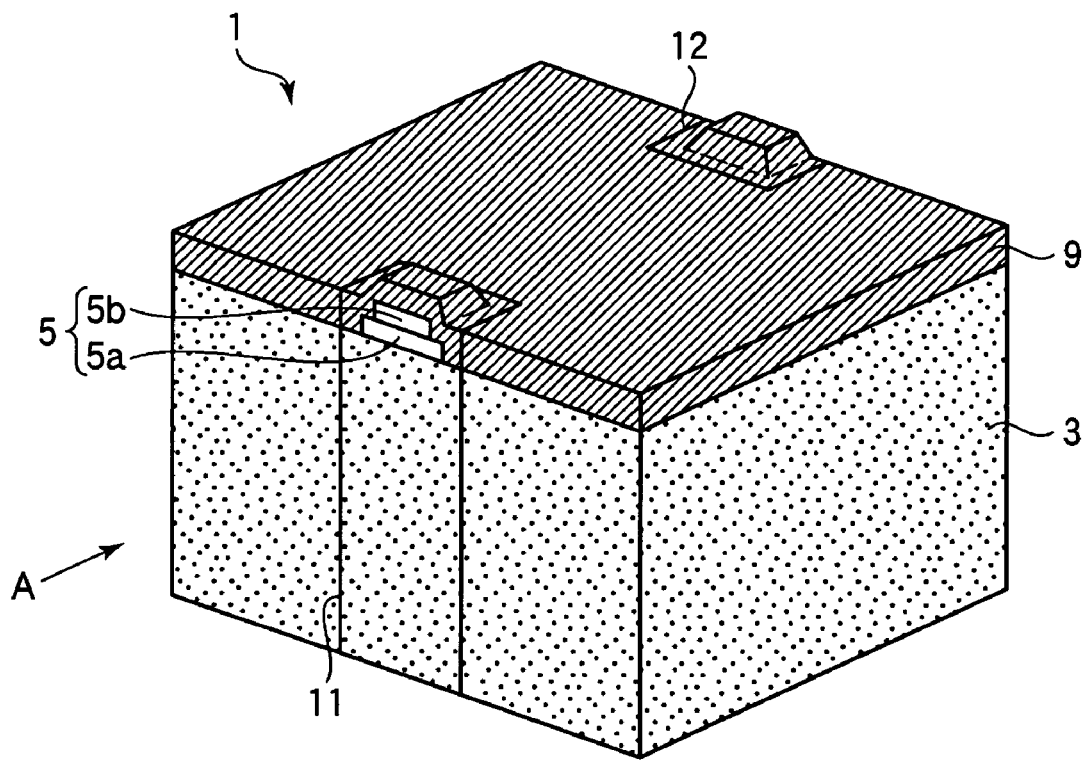
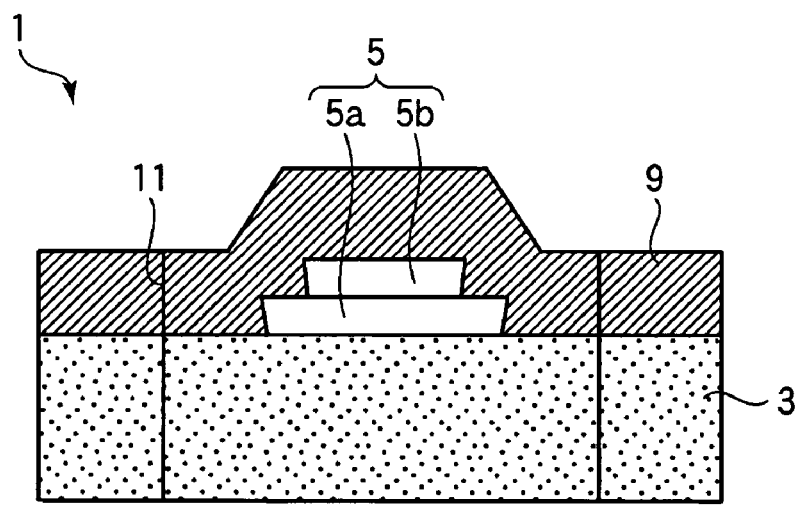

ELECTRONIC COMPONENT

BACKGROUND OF THE INVENTION

1. Field of the Invention

The present invention relates to a surface mount electronic component to be mounted on a printed circuit board or hybrid IC (HIC).

2. Description of the Related Art

Many types of surface mount electronic components are mounted on circuits in electronic apparatus such as personal computers and portable telephones. Known surface mount electronic components include thin film type electronic components formed using thin film forming techniques. A thin film type electronic component has a lead-out electrode which is exposed on an outer surface that is different from a mounting surface and an external electrode which is formed on the outer surface in electrical connection to the lead-out electrode. The lead-out electrode is electrically connected to the external electrode through an exposed part thereof that is exposed on the outer surface. In order to maintain sufficient electrical connection between the lead-out electrode and the external electrode, the lead-out electrode is formed by stacking a plurality of metal thin films to provide the exposed part with a great surface area.

For example, according to a method of manufacturing thin film type electronic components in the related art, a multiplicity of elements such as a lead-out electrode having a multi-layer structure, a plurality of metal thin films constituting circuit elements, and insulation films providing insulation between the metal thin films are formed on a wafer using thin film forming techniques. Then, a protective film for protecting the lead-out electrode, metal film films, and insulation films is formed throughout the wafer to terminate the thin film forming step. Next, the wafer is cut and divided into individual chips. External electrodes are then formed in electrical connection with the lead-out electrodes exposed on the cut surfaces to complete the electronic components. Patent Document 1 discloses a common mode choke coil formed using such a method of manufacturing thin film type electronic components.

Patent Document 1: JP-A-2005-79323

FIG. 5 is a schematic view of a section of a thin film type electronic component 21 according to the related art taken immediately after the component is cut and divided into a chip, the figure showing the neighborhood of a lead-out electrode 25. As shown in FIG. 5, the lead-out electrode 25 is formed on a substrate 3. The lead-out electrode 25 includes a first electrode 25a which has an exposed part exposed on an outer surface (a side surface of the electronic component 21) and a second electrode 25b which has an exposed part exposed on the side surface of the component 21 and having substantially the same electrode width as that of the first electrode 25a and which is formed directly above the first electrode 25a in electrical connection with the first electrode 25a. The term "electrode width" means the length of each of the exposed parts of the first and the second electrodes 25a and 25b in a direction parallel to the contact surface between the first electrode 25a and the second electrode 25b. A protective layer 9 formed from alumina ($Al_2O_3$) is formed throughout the wafer to protect the lead-out electrode 25. Therefore, the protective film 9 must stay directly above the lead-out electrode 25 after the wafer is cut into chips. However, when the wafer is cut and divided into chips, a protective layer 9' on the lead-out electrode 25 may be completely peeled off as indicated by the broken line in FIG. 5. Otherwise, the protective layer 9' directly above the lead-out electrode 25 may be partially peeled off or damaged instead of being completely peeled off.

The protective layer 9 is formed to improve the reliability of the electronic component 21 in terms of heat resistance and pressure resistance. Therefore, when the protective layer 9' directly above the lead-out electrode 25 is peeled off, the reliability of the electronic component 21 is significantly reduced, and the product can no longer satisfy predetermined specifications for the same. The yield of manufacture of such electronic components 21 is therefore reduced, and a problem arises in that the manufacturing cost and the cost of the electronic components itself is increased.

SUMMARY OF THE INVENTION

It is an object of the invention to provide a low-cost electronic component which is reliable in terms of heat resistance and pressure resistance.

The object is achieved by an electronic component including a circuit element inside of the electronic component, comprising a lead-out electrode including a first electrode which is electrically connected to the circuit element and which has an exposed part exposed on an outer surface of the electronic component and a second electrode which has an exposed part exposed on the outer surface of the electronic component to extend an electrode width different from that of the first electrode and which is formed on the first electrode and electrically connected to the first electrode at the exposed part.

The electronic component according to the invention is characterized in that the first electrode is formed greater than the second electrode in terms of the electrode width of the exposed part.

The electronic component according to the invention is characterized in that the first electrode is formed smaller than the second electrode in terms of the electrode width of the exposed part.

The electronic component according to the invention is characterized in that the exposed part of the second electrode is formed to cover the exposed part of the first electrode.

The electronic component according to the invention is characterized in that it further comprises a protective layer formed above the lead-out electrode to protect the lead-out electrode and the circuit element.

The electronic component according to the invention is characterized in that the protective layer is formed from an oxide material.

The electronic component according to the invention is characterized in that the protective layer is formed from alumina.

The electronic component according to the invention is characterized in that the protective layer is formed from a resin material.

The electronic component according to the invention is characterized in that the protective layer is formed from a polyimide resin.

The electronic component according to the invention is characterized in that it further comprises a first conductor layer formed on a level with the layer of the first electrode, a second conductor layer formed on a level with the layer of the second electrode, and an insulation layer formed between the first and the second conductor layers without being exposed on the outer surface.

The electronic component according to the invention is characterized in that the insulation layer is formed from an organic material.

The electronic component according to the invention is characterized in that the insulation layer is formed from an inorganic material.

The electronic component according to the invention is characterized in that it further comprises an external electrode electrically connected to the lead-out electrode and formed on the outer surface.

The invention makes it possible to provide a low-cost electronic component which is reliable in terms of heat resistance and pressure resistance.

BRIEF DESCRIPTION OF THE DRAWINGS

FIGS. 2A and 2B are external perspective views of an inductor 1 as an electronic component according to an embodiment of the invention;

DESCRIPTION OF THE PREFERRED EMBODIMENT

Figure 1:
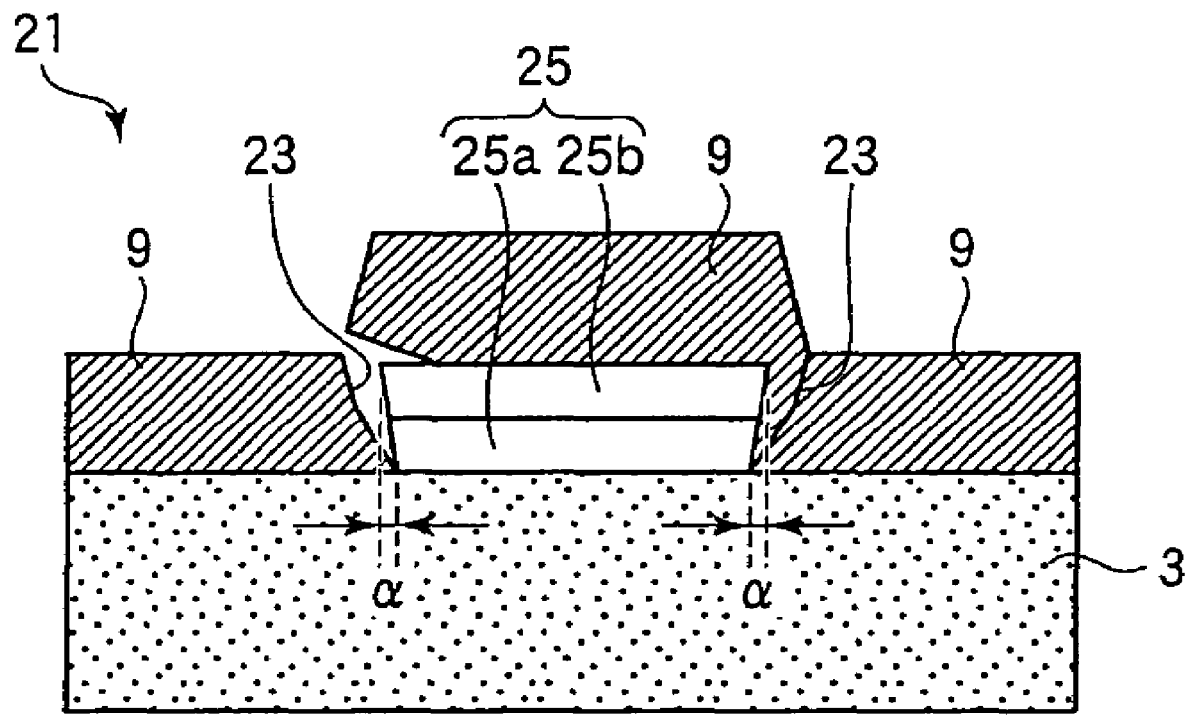
FIG. 1 is an illustration for explaining what causes a protective layer 9 of an electronic component 21 according to the related art to peel off.

An electronic component according to an embodiment of the invention will be described with reference to FIGS. 1 to 4. A description will be first made on what causes a protective layer provided directly above a lead-out electrode to peel off. FIG. 1 schematically shows a section of a chip taken immediately after a wafer is cut and divided into chips at the step of manufacturing electronic components 21 according to the related art shown in FIG. 5.

As shown in FIG. 1, each of first and second electrodes 25a and 25b is formed with a thickness of 8 μm, for example. Since a lead-out electrode 25 thus has a thickness of 16 μm, ends of an exposed part of the lead-out electrode 25 have a relatively large height difference from a substrate 3. The height difference at the ends of the exposed part of the lead-out electrode 25 from the substrate is the height of a flat surface of the lead-out electrode that is closest to the surface of the substrate measured from the substrate surface. In the case of the lead-out electrode 25 in FIG. 1, the height difference is the height of a flat surface of the second electrode 25b in contact with a protective layer 9 above an element forming surface (substrate surface) of the substrate 3 on which the lead-out electrode 25 is formed, and the height difference is therefore equal to the thickness of the lead-out electrode 25.

The lead-out electrode 25 is formed to stand up on the substrate 3 with a relatively large height difference from the substrate 3. Therefore, when the protective layer 9 is formed using sputtering method, a reduction is likely to occur in the step coverage of the protective layer 9 at the ends of the electrode. Further, the exposed part of the lead-out electrode 25 is formed like an inverted trapezoid such that the electrode has a greater electrode width on the side of the protective layer 9 than on the side of the substrate 3. Therefore, the element forming surface of the substrate 3 has regions α which are obscured by the ends of the first and the second electrodes 25a and 25b when viewed from the side of the second electrode 25b. Since the height difference at the ends of the lead-out electrode 25 is relatively large, the regions α are relatively large. The substrate 3 is placed in a sputtering apparatus with the side of the second electrode 25b facing a target material formed of alumina. Since alumina molecules emitted from the target material fall on the side of the substrate where the second electrode 25b is provided, alumina is less apt to be deposited in the regions α than on the top of the second electrode 25b.

Figure 5:
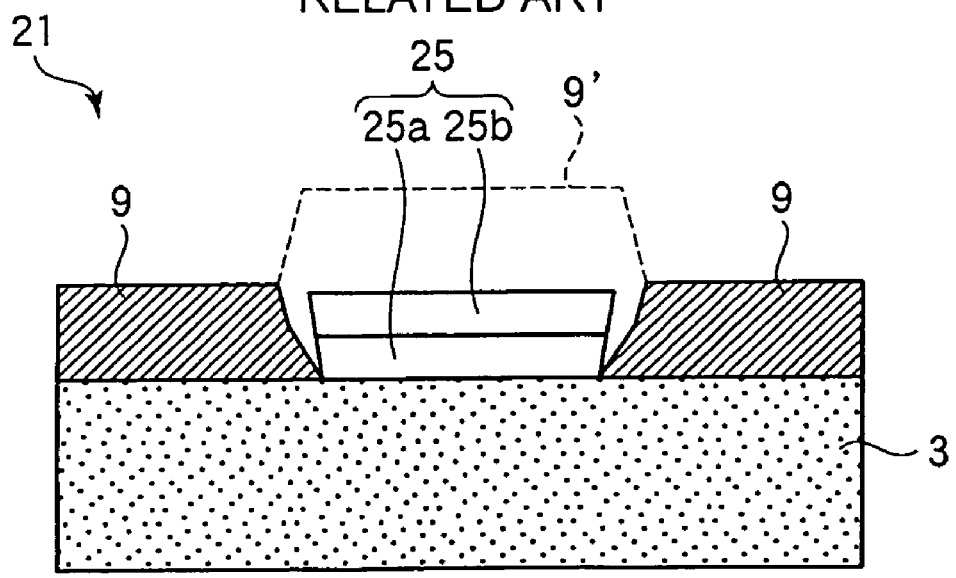
FIG. 5 shows the neighborhood of a lead-out electrode 25 of an electronic component 21 according to the related art.

A hetero-phase boundary 23 is generated in the protective layer 9 in the neighborhood of the ends of the lead-out electrode 25 because of the reduction in step coverage at the ends of the lead-out electrode 25 and the difficulty in depositing alumina in the regions α. The hetero-phase boundary 23 is generated so as to connect the neighborhood of the boundary between an inclined surface of the protective layer 9 and a flat surface of the protective layer 9 directly above the substrate 3 to the regions α. The hetero-phase boundary 23 is generated because the amount of alumina deposited in the neighborhood of the steps at the ends of the lead-out electrode 25 is insufficient because of the reduction in the step coverage of the protective layer 9 and the difficulty in depositing alumina. When a hetero-phase boundary 23 is generated, since the protective layer 9 becomes a non-continuous film, it becomes difficult to obtain sufficient bonding strength between the protective layer 9 and the lead-out electrode 25 against shock at the time of wafer cutting. As a result, when the wafer is cut, a part of the protective layer 9 directly above the lead-out electrode 25 may be damaged or peeled off at the hetero-phase boundary 23 as shown in FIG. 1. Otherwise, the entire protective layer 9 directly above the lead-out electrode 25 may be peeled off at the hetero-phase boundary 23 as shown in FIG. 5.

Under the circumstance, in the case of the electronic component of the present embodiment, the exposed parts of the first and the second electrodes are provided with different electrode widths to make the height difference of the ends of the lead-out electrode from the substrate relatively small. The component is characterized in that the generation of a hetero-phase boundary in the protective layer is thus prevented at the ends of the lead-out electrode to prevent the protective layer from being peeled off.

Next, an inductor will be described as an example of an electronic component including a circuit element. FIGS. 2A and 2B are external perspective views of an inductor 1. For easier understanding, FIG. 2A is a perspective view showing part of a lead-out electrode 5, a substrate 3 and a protective layer 9 which are covered by an external electrode 11 and are therefore invisible in practice. FIG. 2B is a view of the neighborhood of the lead-out electrode 5 taken in the direction of the arrow A shown in FIG. 2A.

As shown in FIG. 2A, the inductor 1 has a general outline in the form of a rectangular parallelepiped, provided by forming the lead-out electrode 5 having a multi-layer structure formed on the substrate 3 formed from alumina ($Al_2O_3$), a coil conductor (not shown) electrically connected to the lead-out electrode 5, and the protective layer 9 for protecting circuit elements including the coil conductor and the lead-out electrode 5 using thin film forming techniques. A surface of the protective layer 9 which is substantially parallel to an element forming surface of the substrate 3 having the lead-out electrode 5 formed thereon constitutes a mounting surface which faces a printed circuit board (PCB), for example, when the inductor 1 is mounted on the PCB (not shown). The inductor 1 may alternatively be mounted with the substrate 3 facing the PCB. In this case, the surface of the substrate 3 opposite to the mounting surface of the protective layer 9 serves as a mounting surface.

As shown in FIGS. 2A and 2B, the lead-out electrode 5 includes a first electrode 5a which is electrically connected to a coil conductor and which has an exposed part exposed on an outer surface (a side surface of the inductor 1) and a second electrode 5b which has an exposed part exposed on the outer surface to extend an electrode width different from an electrode width of the first electrode 5a and which is formed directly above the first electrode 5a and electrically connected to the first electrode 5a. The term "electrode width" means the length of each of the exposed parts of the first and the second electrodes 5a and 5b in a direction parallel to the contact surface between the first electrode 5a and the second electrode 5b. The first electrode 5a is formed such that the electrode width of the exposed part is greater than that of the second electrode 5b. For example, the electrode width of the exposed part of the first electrode 5a is about 250 µm, and the electrode width of the exposed part of the second electrode 5b is about 232 µm. For example, each of the first and the second electrodes 5a and 5b is formed from copper (Cu) with a thickness of about 8 µm. The coil conductor electrically connected to the lead-out electrode 5 is also formed from copper (Cu) with a thickness of about 8 µm, for example. The inductor 1 is provided with a low DC resistance by forming each of the first and the second electrodes 5a and 5b and the coil conductor with a great thickness.

An external electrode 11 is formed on the mounting surface and the side surface of the inductor 1 so as to cover the lead-out electrode 5. Since the lead-out electrode 5 has a two-layer structure formed by the first and the second electrodes 5a and 5b, the surface area of the exposed part can be made greater relative to that of a lead-out electrode having a single-layer structure. Thus, sufficient electrical connection is maintained between the lead-out electrode 5 and the external electrode 11. A lead-out electrode (not shown) having substantially the same shape as the lead-out electrode 5 is also formed to be exposed on an opposite side surface that is opposite to the side surface on which the lead-out electrode 5 is exposed. An external electrode 12 having substantially the same shape as the external electrode 11 is formed so as to cover the lead-out electrode exposed on the opposite side surface and is electrically connected to the lead-out electrode.

The protective layer 9 covering the top of the lead-out electrode 5 is formed throughout the element forming surface of the substrate 3. Referring to the material to form the protective layer 9, an oxide material having relatively high hardness and air-tightness is preferably used to improve the reliability of the inductor 1 in terms of heat resistance and pressure resistance. In the present embodiment, the protective layer 9 is formed to a thickness of about 30 µm using alumina.

The protective layer 9 provided directly above the lead-out electrode 5 is formed to protrude in an amount equivalent to the thickness of the lead-out electrode 5. Since the exposed part of the second electrode 5b is formed with an electrode width smaller than that of the exposed part of the first electrode 5a, the ends of the lead-out electrode 5 are formed like steps. Thus, the flat surface of the lead-out electrode 5 of the inductor 1 closest to the element forming surface of the substrate 3 is the contact surface between the first and the second electrodes 5a and 5b. Therefore, in the inductor 1 of the present embodiment, the height difference at the ends of the lead-out electrode 5 is equal to the thickness of the first electrode 5a, i.e., about 8 µm which is smaller than the height difference (about 16 µm) according to the related art shown in FIG. 1. As thus described, in the inductor 1 of the present embodiment, the height difference of the lead-out electrode 5 from the substrate 3 is substantially one-half of that in the related art. As a result, the protective layer 9 exhibits improved step coverage in the neighborhood of the lead-out electrode 5.

In the present embodiment, each of the first and the second electrodes 5a and 5b is formed in an inverted trapezoidal configuration in which an electrode width on the side of the protective layer 9 is greater than an electrode width on the side of the substrate 3. Referring to regions of the substrate 3 obscured by the ends of the lead-out electrode 5, they are generated only by the ends of the first electrode 5a when viewed from the side of the second electrode 5b. Since the thickness of the first electrode 5a is substantially one-half of that of the lead-out electrode 25 according to the related art, the regions of the substrate 3 obscured by the ends of the first electrode 5a is substantially one-half of the regions α in the related art. Therefore, when the protective layer 9 is formed using sputtering method, alumina emitted from the target material will be more easily deposited on the regions of the substrate 3 obscured by the ends of the first electrode 5a. Since the first and the second electrodes 5a and 5b are substantially equal in thickness, regions of the first electrode 5a obscured by the ends of the second electrode 5b are substantially equal to the regions of the substrate 3 obscured by the ends of the first electrode 5a when viewed from the side of the second electrode 5b. As a result, alumina emitted from the target material is also easily deposited on the regions of the first electrode 5a obscured by the ends of the second electrode 5b.

As thus described, the inductor 1 of the present embodiment is improved the step coverage of the protective layer 9 compared to the inductor according to the related art. And the inductor 1 is reduced the difficulty in depositing alumina compared to the inductor according to the related art. Therefore, the generation of a hetero-phase boundary is unlikely to occur in the protective layer 9 in the neighborhood of the ends of the lead-out electrode 5. Even if a hetero-phase boundary is generated, it will be limited to a quite small area. Since the bonding strength between the protective layer 9 and the lead-out electrode 5 is kept sufficiently high against shock at the time of wafer cutting, the protective layer 9 directly above the lead-out terminal 5 is prevented from peeling off. As a result, the inductor 1 can be manufactured with improved yield, and the manufacturing cost and the cost of the inductor 1 can therefore be kept low. In the present embodiment, since the lead-out electrode 5 has a two-layer structure which allows the exposed part to have a great surface area, it is possible to maintain sufficient electrical connection to the external electrode 11.

A method of manufacturing an electronic component according to the present embodiment will now be described using FIG. 3 with reference to the inductor 1 by way of example. A multiplicity of inductors 1 are simultaneously formed on a wafer, and FIG. 3 is an exploded perspective view of one of the inductors 1 showing a multi-layer structure of an element forming region of the same.

Figure 3:
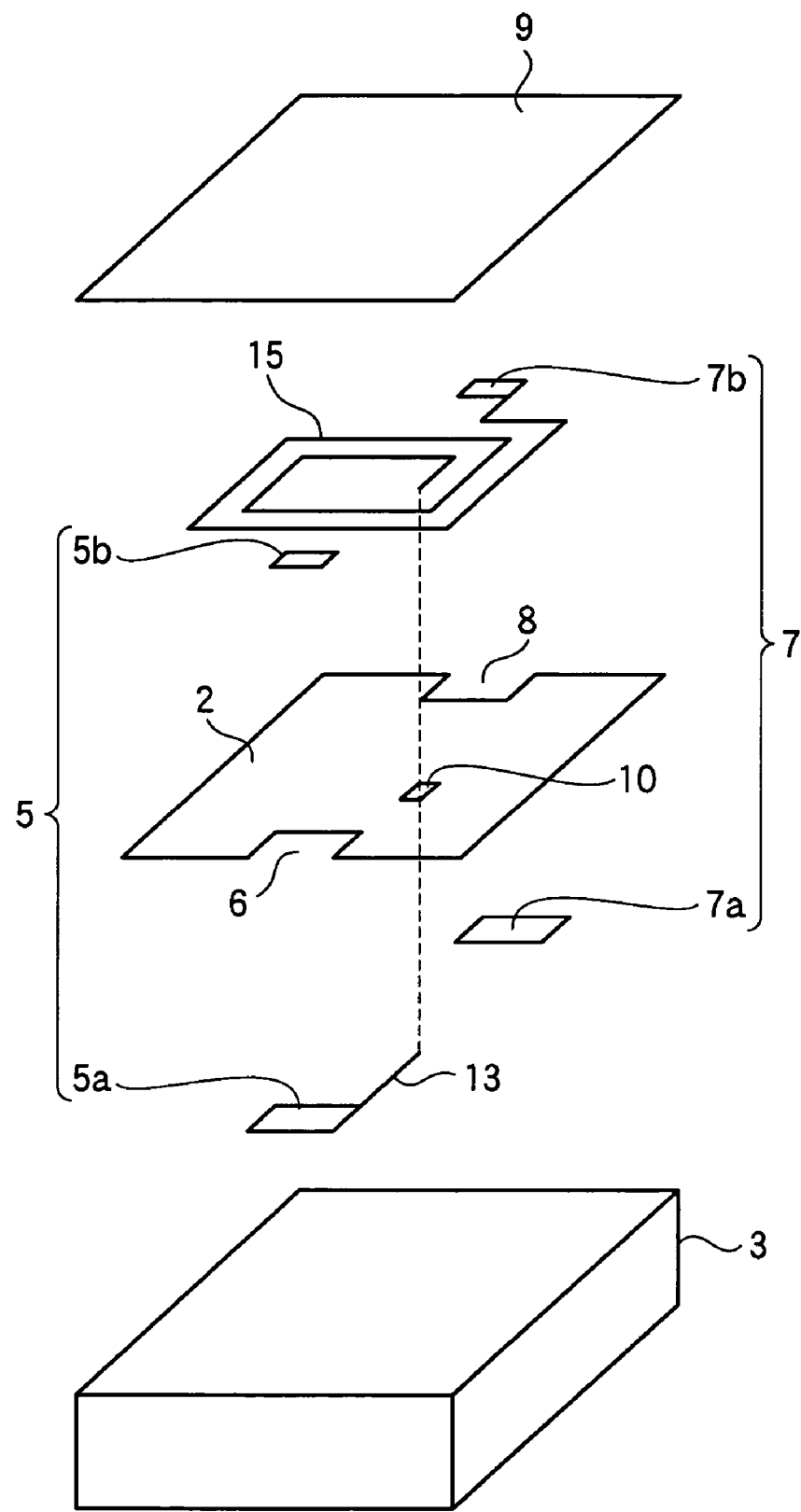
FIG. 3 is an exploded perspective view for explaining a method of manufacturing the inductor 1 as an electronic component according to the embodiment of the invention.

First, as shown in FIG. 3, a metal layer (e.g., a Cu layer) is formed throughout a surface of a substrate 3 formed from, for example, alumina using a vacuum film forming method (deposition method or sputtering method) or a plating method. The Cu layer is then patterned using an etching method or additive method utilizing photolithography or a pattern plating method to form a first electrode 5a having an exposed part located at one edge of an element forming region of the substrate 3, and a first electrode 7a provided opposite to the first electrode 5a such that an exposed part of the same is located on another edge opposite to the above-mentioned edge. A lead wire (first conductor layer) 13, which is connected to the first electrode 5a, is formed in the same layer where the first electrodes 5a and 7a reside at the same time when the electrodes are formed. For example, the first electrodes 5a and 7a are formed like a thin rectangular parallelepiped. Each of the exposed parts of the first electrodes 5a and 7a is formed to have an electrode width of, for example, about 250 μm. The first electrodes 5a and 7a and the lead wire 13 are formed with a thickness of, for example, about 8 μm. The formation and patterning of the Cu layer to be described later is carried out using the same method as the first electrodes 5a and 7a and the lead wire 13. The material to form the metal layer is not limited to Cu, and gold (Au), silver (Ag) or aluminum (Al) may alternatively be used.

Next, an organic material, e.g., polyimide resin is applied and patterned inside the element forming region to form an insulation layer 2 having openings 6 and 8 at which top surfaces of the first electrodes 5a and 7a are exposed respectively and a contact hole 10 at which the end of the lead wire 13 that is not connected to the first electrode 5a is exposed. The insulation layer 2 is formed with a thickness of, for example, about 5 μm inside the element forming region such that it will not be exposed on a cut surface when the wafer is cut and divided. In an overall view of the wafer, the insulation layers 2 is formed in the form of a plurality of islands separated by wafer cutting lines. The insulation layer 2 is formed using the spin coat method, dipping method, spray method, or printing method and so on. An inorganic material may alternatively be used as the material to form the insulation layer 2.

Next, a Cu layer (not shown) is formed throughout the surface. Second electrodes 5b and 7b in electrical connection with the first electrodes 5a and 7a respectively are formed on the first electrodes 5a and 7a respectively. A coil conductor (second conductor layer) 15 patterned in a spiral shape is formed on the insulation layer 2 in the same layer where the second electrodes 5b and 7b resides at the same time when the electrodes are formed. For example, the second electrodes 5b and 7b are formed like a thin rectangular parallelepiped. An exposed part of the second electrode 5b is formed so as to be included in the same plane as the exposed part of the first electrode 5a, and an exposed part of the second electrode 7b is formed so as to be included in the same plane as the exposed part of the first electrode 7a. For example, each of the exposed parts of the second electrodes 5b and 7b is formed to have an electrode width of about 232 μm. Each of the exposed parts of the first electrode 5a and the second electrode 5b is formed in a plane including one edge of the element forming region and extending orthogonally to the element forming region, and each of the exposed parts of the first electrode 7a and the second electrode 7b is formed in a plane including the other edge of the element forming region and extending orthogonally to the element forming region. Peripheral edges of the second electrodes 5b and 7b excluding the exposed parts are formed inside peripheral edges of the first electrodes 5a and 7a, respectively. Thus, a lead-out electrode 5 is formed, which has a two-layer structure formed by the first and the second electrodes 5a and 5b and which has a relatively small height difference from the substrate 3 at the ends of the exposed parts thereof. Another lead-out electrode 7 is also formed, which has a two-layer structure formed by the first and the second electrodes 7a and 7b and which has a relatively small height difference from the substrate 3 at the ends of the exposed parts thereof.

One terminal of the coil conductor 15 is connected to the end of the lead wire 13 exposed at the contact hole 10, and another terminal of the same is formed on the insulation layer 2 in connection with the second electrode 7b. As a result, the lead-out electrode 5 and the lead-out electrode 7 are electrically connected through the coil conductor 15. Since the insulation layer 2 is formed between the lead wire 13 and the coil conductor 15, parts of the lead wire 13 and the coil conductor 15 crossing each other are insulated by the insulation layer 2 except the parts connected through the contact hole 10 when the substrate 3 is viewed from the side of the coil conductor 15.

Next, a protective layer 9 made of alumina is formed through out the surface using the sputtering method. For example, the protective layer 9 is formed to a thickness of about 30 μm. Since the lead-out electrodes 5 and 7 have a small height difference from the substrate 3 at the ends thereof compared to the lead-out electrode 25 according to the related art, the generation of a hetero-phase boundary in the protective layer 9 can be prevented in the neighborhood of the ends. Referring to the method of forming the protective layer 9, although the chemical vapor deposition method (CVD) or spin coat method may be used, the sputtering method is a preferred method for forming the protective layer 9 because it has advantages such as the capability of forming a predetermined film exhibiting high adhesion to a substrate, a high film forming rate, and the capability of forming a film at low temperatures. Since the steps formed at the ends of the exposed parts of the lead-out electrodes 5 and 7 are small, the protective layer 9 can be provided with high flatness, and a photolithographic step can be easily performed to pattern a predetermined film on the protective layer 9 into a predetermined configuration.

Next, the wafer is cut along predetermined cutting lines to separate the plurality of inductor elements formed on the wafer into a chip in each element forming region. Since there is predetermined bonding strength between the protective layer 9 and the lead-out electrode 5 when no hetero-phase boundary exists, the protective layer 9 directly above the lead-out electrodes 5 and 7 is prevented from being peeled off by shock when the wafer is cut. Since the lead-out electrodes 5 and 7 are located at one and another edge of the element forming region, respectively, they are exposed on side surfaces which are wafer cutting surfaces. On the contrary, the insulation layer 2 is not exposed on the side surfaces because it is formed inside the element forming region. Next, external electrodes 11 and 12 are formed which are electrically connected to the lead-out electrodes 5 and 7, respectively, and which cover the lead-out electrodes 5 and 7 exposed at the side surfaces (see FIGS. 2A and 2B). Then, corners of the chip are chamfered as occasion demands to complete an inductor 1 as shown in FIG. 2A.

As described above, in the present embodiment, the protective layer 9 directly above the lead-out electrodes 5 and 7 is prevented from being peeled of f by chock at the time of wafer cutting. Thus, the inductor 1 can be manufactured with improved yield, and the manufacturing cost and the cost of the inductor 1 itself can therefore be kept low.

Figure 4:
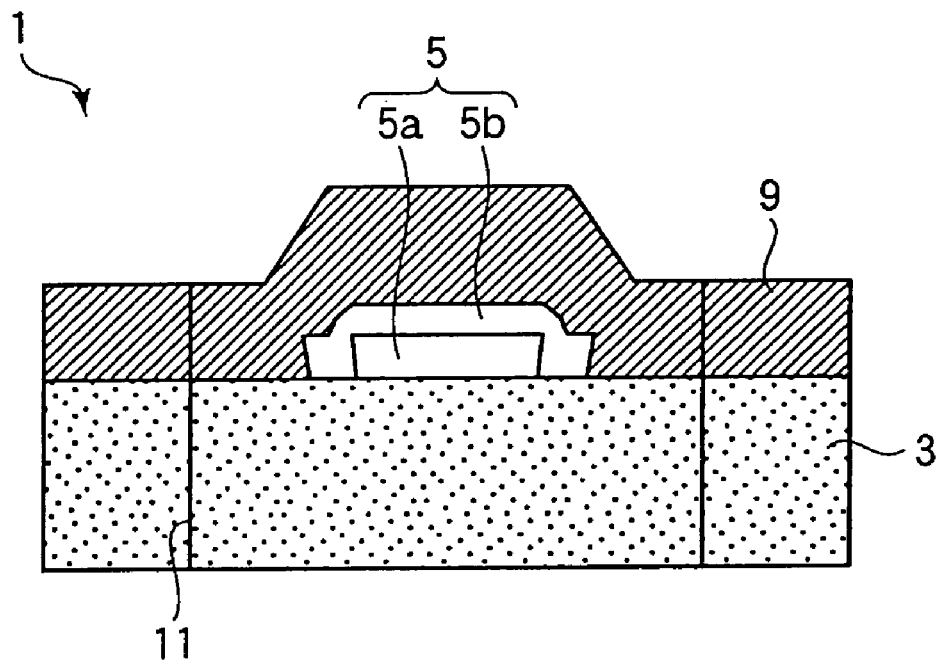
FIG. 4 shows the neighborhood of a lead-out electrode 5 of an inductor 1 which is a modification of an electronic component according to the embodiment of the invention.

An inductor 1 according to a modification of the present embodiment will now be described with reference to FIG. 4. FIG. 4 schematically shows the neighborhood of a lead-out electrode 5 of the inductor 1 of the present modification. As shown in FIG. 4, the inductor 1 of the present modification is characterized in that a first electrode 5a is formed with an electrode width smaller than an electrode width of a second electrode 5b.

As shown in FIG. 4, the second electrode 5b is formed to cover the first electrode 5a entirely. For example, the first electrode 5a has an electrode width of about 218 μm at an exposed part thereof, and the second electrode 5b has an electrode width (the distance between two ends of the electrodes) of about 250 μm at an exposed part thereof. Each of the first and the second electrodes 5a and 5b is formed with a thickness of about 8 μm. Since the lead-out electrode 5 has a two-layer structure formed by the first and the second electrodes 5a and 5b, the electrode has a maximum thickness of about 16 μm. However, the height of a flat surface of the lead-out electrode 5 closest to the substrate 3 is equivalent to the thickness of the second electrode 5b. Therefore, the height difference of the lead-out electrode 5 from the substrate 3 is about 8 μm. The inductor 1 of the present modification is similar to the inductor 1 shown in FIGS. 2A and 2B in that the height difference of the ends of the lead-out electrode 5 from the substrate 3 is smaller than such a height difference in the related art. Further, since the second electrode 5b is formed to cover the first electrode 5b entirely, the second electrode 5b is inclined at a small angle to the element forming surface of the substrate 3 at the ends of the first electrode 5a. As a result, the protective layer 9 of the inductor 1 in the present modification has improved step coverage. Further, since the height difference of the ends of the lead-out terminal 5 from the substrate 3 is relatively small, the difficulty in depositing alumina is reduced. Therefore, the generation of a hetero-phase boundary is prevented in the protective layer 9 of the inductor 1 of the present modification, which provides the same advantage as that of the inductor 1 shown in FIGS. 2A and 2B.

The invention is not limited to the above-described embodiment and may be modified in various ways.

Although the above embodiment has addressed an inductor 1 as an example of an electronic component including a circuit element, the invention is not limited to the same. The invention provides the same advantage as achieved in the above-described embodiment when applied to any electronic component having a lead-out electrode exposed on a side surface thereof and a protective layer formed on the lead-out electrode, e.g., a capacitor, resistor, low-pass filter, band-pass filter, diplexer, or antenna switching module.

Although one lead-out electrode is formed on one side surface of an electronic component, the invention is not limited to such a configuration. For example, the same advantage as in the above-described embodiment can be achieved even in an electronic component having two or more lead-out electrodes on one side surface thereof such as a common mode choke coil.

The same advantage as in the above-described embodiment can be achieved even in an electronic component having lead-out electrodes for energization exposed on a pair of side surfaces opposite to each other and lead-out electrodes for shielding (grounding) exposed on another pair of side surfaces opposite to each other, e.g., a filter component such as a low-pass filter.

Although alumina is used as the material to form the protective layer 9 in the above-described embodiment, the invention is not limited to the same. The material of the protective layer 9 may be a resin material such as polyimide resin. When the ends of the lead-out electrode have a relatively large height difference from the substrate, a resin material is insufficiently supplied to the end regions when the resin material is formed on the substrate using, for example, the spin coat method, which results in a possibility of generation of air bubbles in the protective layer in the neighborhood of the ends of the lead-out electrode (beside the lead-out electrode). When air bubbles are generated in the protective layer, the reliability of the electronic component is reduced in terms of pressure resistance. In the above-described embodiment, however, since the ends of the led-out electrode 5 have a relatively small height difference from the substrate 3, the shortage of the resin material supplied to the end regions is prevented, which allows the generation of air bubbles in the protective layer to be prevented. As a result, the reliability of the electronic component such as the inductor 1 can be improved in terms of pressure resistance, which allows the advantage as described in the above embodiment to be achieved.

Although each of the exposed parts of the first and the second electrodes 5a and 5b is formed in an inverted trapezoidal shape in the above-described embodiment, the invention is not limited to such a shape. The exposed parts of the first and the second electrodes 5a and 5b may be formed in a trapezoidal shape or rectangular shape in which the electrode width is smaller on the side of the protective layer 9 than on the side of the substrate 3. Even when the exposed parts of the first and the second electrodes 5a and 5b are formed in a trapezoidal shape or rectangular shape, the protective layer 9 can be provided with improved step coverage by forming the exposed parts with different electrode widths. When the exposed parts of the first and the second electrodes 5a and 5b are formed in a trapezoidal shape or rectangular shape, the substrate 3 and the first electrode 5a will not be obscured by the ends of the first and the second electrodes 5a and 5b respectively in any region thereof. Thus, the problem of the difficulty in depositing alumina is substantially eliminated. Therefore, the same advantage as in the above-described embodiment can be achieved even when the exposed parts of the first and the second electrodes 5a and 5b are formed in a trapezoidal shape or rectangular shape.

The invention may be used regardless of the shape of the exposed parts of the first and the second electrodes 5a and 5b. However, since the invention makes it possible to reduce difficulty in depositing alumina as described above, the invention is advantageous especially when applied to an electronic component having a lead-out electrode in a shape which can obscure a region of a substrate 3.

What is claimed is:

1. An electronic component including a circuit element inside of the electronic component, comprising a lead-out electrode including a first electrode which is electrically connected to the circuit element and which has an exposed part exposed on an outer surface of the electronic component and a second electrode which has an exposed part exposed on the outer surface of the electronic component to extend an electrode width different from that of the first electrode and which is formed on the first electrode and electrically connected to the first electrode at the exposed part; and a protective layer formed above the lead-out electrode to protect the lead-out electrode and the circuit element, wherein the first electrode has a first side surface, a second side surface, and a top surface, the top surface being completely covered by the second electrode, wherein the second electrode covers the first side surface of the first electrode, the second side surface of the first electrode, and the top surface of the first electrode, and makes contact with the substrate, and the protective layer is a continuous film covering from a top surface of the lead-out electrode to the substrate.

2. An electronic component according to the claim 1, wherein the protective layer is formed from an oxide material.

3. An electronic component according to claim 2, wherein the protective layer is formed from alumina.

4. An electronic component according to claim 1, wherein the protective layer is formed from a resin material.

5. An electronic component according to claim 4, wherein the protective layer is formed from a polyimide resin.

6. An electronic component according to claim 1, further comprising:

a first conductor layer formed on a level with the layer of the first electrode;

a second conductor layer formed on a level with the layer of the second electrode; and an insulation layer formed between the first and the second conductor layers without being exposed on the outer surface.

7. An electronic component according to claim 6, wherein the insulation layer is formed from an organic material.

8. An electronic component according to claim 6, wherein the insulation layer is formed from an inorganic material.

9. An electronic component according to claim 1, further comprising an external electrode electrically connected to the lead-out electrode and formed on the outer surface.

10. An electronic component according to claim 1, wherein a height of a flat surface of the lead-out electrode closest to the substrate is equivalent to the thickness of the second electrode; and the flat surface is a top surface of the second electrode.

* * * * *